United States Patent
Haraway

[11] Patent Number: 6,085,987
[45] Date of Patent: Jul. 11, 2000

[54] COUNTER BALANCE ASSEMBLY FOR GRAIN CONDUIT

[76] Inventor: Coy N. Haraway, 1065 Blake Rd., Cordova, Tenn. 38018

[21] Appl. No.: 09/323,355

[22] Filed: Jun. 1, 1999

Related U.S. Application Data

[60] Provisional application No. 60/087,682, Jun. 2, 1998.

[51] Int. Cl.[7] ............................. B05B 17/04; B05B 1/32
[52] U.S. Cl. ......................... 239/11; 239/452; 239/455; 239/537; 239/569; 239/590.5; 239/650; 239/451
[58] Field of Search .............................. 239/11, 451, 452, 239/455, 537, 569, 570, 650, 659, 689; 193/2 C, 32; 222/491, 494, 517; 414/299

[56] References Cited

U.S. PATENT DOCUMENTS

| | | |
|---|---|---|
| 1,024,297 | 4/1912 | Thompson . |
| 1,231,778 | 7/1917 | Nall . |
| 1,668,218 | 5/1928 | Sherban . |
| 1,820,297 | 8/1931 | Butler . |
| 2,035,329 | 3/1936 | McPhail . |
| 2,094,707 | 10/1937 | Jones . |
| 2,217,710 | 10/1940 | Shaler . |
| 2,294,290 | 8/1942 | Freeman . |
| 2,617,531 | 11/1952 | Palmer . |
| 2,676,668 | 4/1954 | Lindsay . |
| 2,761,186 | 9/1956 | Peterson . |
| 2,791,355 | 5/1957 | Morgan, Jr. . |
| 2,913,145 | 11/1959 | Hopkins et al. . |
| 2,968,400 | 1/1961 | Clute . |
| 2,976,676 | 3/1961 | Kress . |
| 3,005,547 | 10/1961 | Freeman . |
| 3,167,089 | 1/1965 | Gordon . |
| 3,223,215 | 12/1965 | Budjinski et al. . |
| 3,254,869 | 6/1966 | Easey . |
| 3,365,240 | 1/1968 | Gordon . |
| 3,485,420 | 12/1969 | Lucas . |
| 3,491,923 | 1/1970 | Osipov . |
| 3,794,386 | 2/1974 | Hite . |
| 3,923,210 | 12/1975 | Jackson . |
| 4,203,535 | 5/1980 | Burnett et al. . |
| 4,342,383 | 8/1982 | Burnett . |
| 4,410,076 | 10/1983 | West et al. ................................. 193/32 |
| 4,552,573 | 11/1985 | Weis et al. ............................. 193/32 X |

FOREIGN PATENT DOCUMENTS 69669   11/1958   France .

OTHER PUBLICATIONS

Redwing, *G–360 Nozzle*, Brochure, Mar. 1979.

*Primary Examiner*—Andres Kashnikow
*Assistant Examiner*—Robin O. Evans
*Attorney, Agent, or Firm*—Wood, Herron & Evans, L.L.P.

[57] ABSTRACT

A variable accumulator or regulator controls grain or other particulate material falling through and being discharged from a conduit. An array of blades are mounted at the discharge end of the accumulator to control the flow of the particulate material therefrom. A counterbalance mechanism is coupled to each of the blades and can be precisely adjusted to provide the appropriate counterbalancing force on the blades to control the particulate material flow without damage to the particulate material.

20 Claims, 4 Drawing Sheets

COUNTER BALANCE ASSEMBLY FOR GRAIN CONDUIT

This claims the benefit of U.S. Provisional Patent Application Serial No. 60/087,682, filed Jun. 2, 1998 and hereby incorporated by reference in its entirety.

BACKGROUND OF THE INVENTION

Grain and other particulate material falling uncontrolled at high velocities causes: (1) damage to the grain and other particulate material and (2) creates dust. The damage occurs both during fall in a downwardly inclined conduit, as well as upon impact after discharge from the conduit. The damage is apparently caused by particle-to-conduit abrasion and particle-to-particle impact, and causes fines and dust.

There exists a particular fall velocity above which the affect on the quality and value of the grain or other particulate material becomes unacceptable. This "damaging velocity" can vary with the type and density of the grain or other particulate material, its dryness, and the type of conduit, but in many cases it is in the vicinity of about 1600 feet per minute. If the grain or other particulate material velocity exceeds the threshold of damage for that stream, grain or other particulate material quality is affected to an unacceptable degree.

The velocity increase is of course most rapid in a vertical conduit, but even in a slanting conduit, velocities of several hundred feet per minute are attained in a few feet. A free-falling stream tends to reach a terminal velocity because the air currents cause turbulence within an unconfined stream. Grain or other particulate material flowing in conduits can reach velocities well above such terminal velocities upon discharge. In a long conduit, the velocity of the stream can exceed even two thousand feet per minute. The damaging velocity is apparently not highly dependent on the angulation of the conduit; that is, the damaging velocity is roughly the same for a given stream whether it is falling in a vertical conduit or an angulated conduit.

For a given type of grain or other particulate material, a velocity of 1600 feet per minute is the approximate damaging velocity in many cases. The same phenomenon of unreasonable damage to the material as the result of high conduit velocities also arises with materials other than grain, although it is most important in respect to grain because of the relative frangibility and layered structure of grain kernels.

To prevent a falling particulate stream of material from exceeding damaging velocity, the most straightforward approach is to limit the distance of the drop or to angulate the conduit so that the velocity increase is less. However, it is difficult to avoid the need for a substantial elevation change in many instances, as for example in loading grain or other particulate material into the hold of a ship.

In some situations, a flow restriction in the path of the falling material slows the material velocity. So called "dead boxes" are known for that purpose and comprise a narrow fixed throat section which can be mounted directly in the conduit. However, dead boxes are effective primarily in those situations where the grain or other particulate material flow rate (i.e., bushels per hour) is constant or within a relatively small range so that there are no "surges." That is not usually the case. In the typical situation, surges—abrupt increases in flow rate, followed by decreases—occur repeatedly. Surging occurs, for example, when a conveyor bucket empties into the upper end of the spout and a period of lower flow may follow, until another bucket refills the chute. Non-uniform moisture content in the grain or other particulate material is another cause of surges.

When the flow is uneven, the use of a fixed restriction to retard flow is of little effect. In periods of low flow rate, the small stream passes almost unrestrained through the throat opening; and at periods of heavy flow, a "head" of grain or other particulate material builds up rapidly above the throat. This can cause bridging or clogging which can choke off flow completely.

In addition to the problem of damage to the grain or particulate material due to high falling velocities, air entrained within the falling stream is a significant problem due to the creation of dust. Ambient dust as a result of a falling stream of particulate material typically requires workers to wear masks or other protective gear. Furthermore, the work environment is clouded by the dust and workers have difficulty seeing for secure footing and evaluation of the level of fill of the vessel receiving the grain or particulate material.

One known method and apparatus for reducing the dust and fall velocity of grain or other particulate material in inclined conduits, vertical as well as angulated to vertical, by which the velocity can be prevented from exceeding the damaging value even under widely varying flow rates, is disclosed in U.S. Pat. No. 4,342,383, hereby incorporated by reference in its entirety.

The apparatus of the invention of the '383 patent comprises a variable accumulator and gate which is responsive to the rate of flow of the stream, and which reduces its velocity without causing clogging or bridging. This is achieved by the provision of a conical or slanting variable throat having an outlet opening area substantially smaller than the cross section of the incoming stream and which establishes an accumulation of grain or other particulate material above the gate or opening. The accumulation rises, and its weight increases, as incoming flow rate increases. The weight of this accumulation is sensed and the area of the opening is increased as the weight increases which provides for an increased rate of release of grain or other particulate material through the gate. Under normal conditions the gate slows the velocity nearly to zero at the point of accumulation, but since the accumulation is discharged more rapidly as it builds, the danger of bridging or clogging is reduced.

An array of downwardly and inwardly sloping blades is supported by the body of the accumulator in the '383 patent. The blades have lower ends which define an opening between them, the opening having an area that at its maximum is substantially smaller than the area of the conduit. The overlapping blades are angulated inwardly so that they deflect the grain particles centrally as they fall. The inward deflection of the particles toward the smaller area of the throat causes a mass of grain or other particulate material particles to accumulate above the blades and over the opening in an accumulation chamber within the body.

In that invention, a variable biasing means acts on the blades to urge them inwardly and the biasing means is responsive to the weight of the accumulated mass of the particles to provide a larger opening as the weight increases, thereby to release particles more rapidly from the accumulation space above the blades and to reduce the area of the opening as the weight of particles decreases. The blade biasing means of the '383 patent comprises a torsion spring which acts on each blade adjacent the lower end thereof.

However, the adjustability of the torsion spring biasing mechanism disclosed in the '383 patent in some instances is inadequate. In an accumulator or regulating device, such as that disclosed in the '383 patent, it is important to keep the biasing force of the blades on the grain or other particulate material flow without applying excessive force to cause the grain or other particulate material to back-up and the accumulation mass above the gate or opening of the blades to grow too large and become clogged or jammed. A single accumulator or regulator system is often used for a variety of grain or other particulate material types, flow diameters, flow speeds, drop heights or quantities. Variable kinds of grains include grains of varying moisture content and varying weight. Such a variety of grains and other materials produces variable input forces and requires a variable biasing force to most efficiently and accurately regulate the flow preferably without constant attention by an operator. Furthermore, the regulator or accumulator should be highly sensitive to these variable flow parameters without damaging the grain or other material flowing therethrough or create an excess of dust or the like.

SUMMARY OF THE INVENTION

These and other objectives of the invention have been attained by an improved mechanism for delivering a biasing force to the blades of an accumulator or regulator as described in the '383 patent. The present invention incorporates and takes advantage of a series of physical laws to create a clean, controlled flow of material to the receiving vessel.

The worst enemy of clean stream delivery is air. The first objective then of the invention is to remove the air from the material. The next step is then to separate as much of the dust as possible from the heavier particles momentarily and reintroduce the fines into the center of the flowing material stream where the heavier particles will act as a moving conduit within which the fines will travel.

Specifically, the present invention includes a counterbalancing mechanism coupled to the blades of an accumulator or regulator as in the '383 patent attached to a conduit for regulating the flow of particulate material such as grain or the like passing through the conduit. The present invention preferably includes an impeller or distributor in the material flow path to separate the fines from the larger particles. The impeller/distributor rotates on two sets of sealed bearings at relatively slow RPM, and is driven by the power of the particulate stream or an auxiliary motor. Centrifugal force applied along the curved path of the impeller surface thrusts the heavier particles toward the wall of the nozzle body. As the heavier particles, by nature of their greater density, travel farther than the lighter dust particles, the heavier particles actually reach the wall and continue their spiral path downward while the boundary layer effect causes the lighter dust particles to eddy over the impeller's edge and fall closer to the center of the stream. The finer the particle, the nearer it comes to acting like a true fluid in this boundary layer separation.

The present invention also includes the series of overlapping flexible leaves or blades. The flow volume is balanced to a given flow rate range by a system of adjustable counterbalances which include lever arms which maintain the required pressure on these blades.

The balancing mechanism produces a biasing force on the blades to bias the blades towards a center line axis of the conduit and reduce the area of the opening defined by the blades. Furthermore, the counterbalancing mechanism permits the blades to move outwardly from the center line in response to the weight of the mass of accumulated material in the chamber.

The counterbalancing mechanism according to a presently preferred embodiment of this invention includes a counterweight and the biasing force delivered by the counterbalancing mechanism on the blades is adjustable as a function of at least one of the mass of the counterweight, an angular position of the counterweight relative to the center line axis and a radial position of the counterweight relative to the center line axis.

More particularly, the counterweight is adjustably mounted onto the lever arm of the counterbalancing mechanism. The lever arm is pivotally mounted to a mounting bracket attached to a valve ring. The angular position of the lever arm is fixed during operation of the accumulator or regulator; however, the angular position of the lever arm is adjustable to thereby adjust the biasing force delivered by the counterbalancing mechanism on the blades. Furthermore, the mass or size of the counterweight can be increased or decreased as appropriate to likewise adjust the biasing force on the blades. Finally, the position of the counterweight on the lever arm can be selectively adjusted to thereby alter the biasing force delivered to the blades.

A roller is pivotally coupled to the mounting bracket of the counterbalancing mechanism and is placed into contact with an outer surface of the blades to deliver the biasing force to the blades.

This invention not only includes the counterbalancing mechanism, but also contemplates a method for regulating the flow of a stream of particulate material such as grain falling through a conduit, retrofitting an existing accumulator or regulator with the counterbalancing mechanism, and an accumulator or regulator originally equipped with the counterbalancing mechanism.

Generally, with this invention the flow of material is interrupted sufficiently to build up a head of the material in the lower part of the accumulator. This retained head or accumulated mass of material acts as an air stop to: 1) remove entrained air from the material, and 2) to keep any air from escaping the accumulator which might induce turbulence in the exiting stream of material. As this retained head or mass of material is built up, the pressure of the material continues to open the blades which works to maintain a constant retained head of material and a compacted exit stream.

Due to the compacting effect taking place here, any remaining air in the material is squeezed out and expelled up through the hollow, vented impeller/distributor. This slight pressure differential below the impeller further aids the movement of fines toward the center of the accumulator.

The peripheral supply of heavier particles to this retained head and the flow of material being drawn from the center of the head creates an inverted cone form in the retained head or accumulated mass. Heavier particles, moving toward the center of this conical basin further pushes the fines toward the center of the stream exiting the accumulator.

Also, the present invention benefits from a natural phenomenon of the particle-to-particle attraction. This is an important function due to the fact that dust particles that may not have found their way to the center of the stream are attracted to other particles in the stream.

The exiting material stream flows from the accumulator in a tapered cylindrical stream typical of laminar flow, the exterior of this stream forming a sheath of "clean" particles which surround the dust-bearing core.

On impact at the pile of material building in the receiving vessel, the material column, in effect collapsing on itself, tends to smother the release of any dust that might otherwise break from its attraction to other particles, and even redistribution of the dust and fines within the material mass, and limited dust 'bounce-back' are the results.

Safety and improved working conditions are other advantages of the invention. The accumulator and associated components are so effective in controlling ambient dust, workers in many cases need not wear masks or other apparatus, and are able to see clearly what their footing is and the level of material in the receiving vessel.

The air free mass of material also allows denser loading of light materials, taking the most advantage of allowable weights loaded. As such, reduced losses, cleaner, safer working conditions and drastically reduced clean-up labor are other advantages.

As a result of this invention, a highly sensitive biasing mechanism for the blades avoids an excessive or inadequate accumulation of grain or other particulate material prior to exiting the opening in the accumulator. As such, the system can be easily and conveniently adjusted to account for variations in grain or other particulate material flow, grain or other particulate material parameters or other particulate material as appropriate to reduce particulate material velocity and minimize dust.

BRIEF DESCRIPTION OF THE DRAWINGS

The objectives and features of the invention will become more readily apparent from the following detailed description taken in conjunction with the accompanying drawings in which.

DETAILED DESCRIPTION OF THE INVENTION

Figure 1:
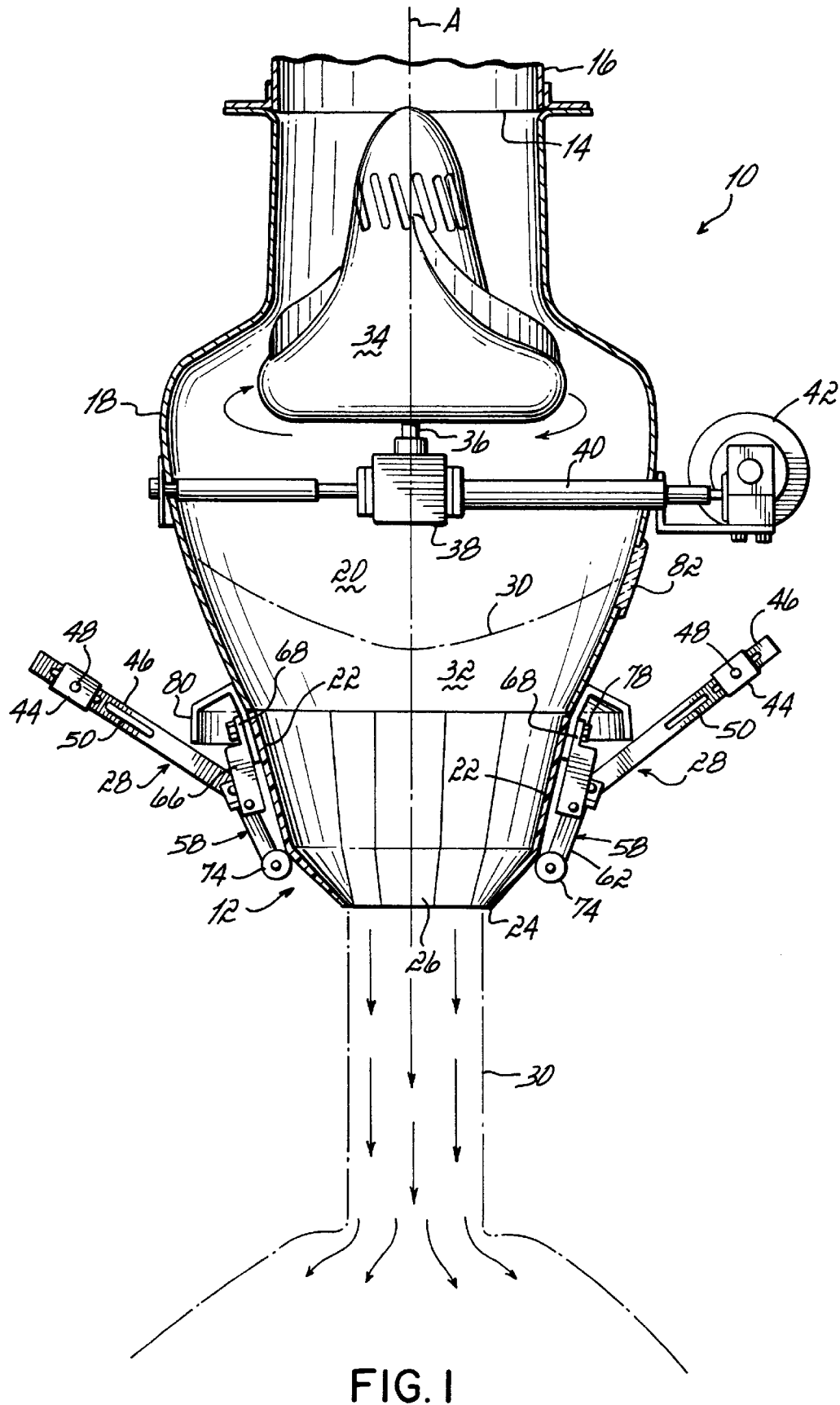
FIG. 1 is a cross-sectional view of a conduit connected to an accumulator and a plurality of blades each with a counterbalance mechanism according to a presently preferred embodiment of this invention.

Referring to FIG. 1, a regulator or variable accumulator 10 including a gate in the form of a valve ring assembly 12 at a lower end thereof according to a presently preferred embodiment of this invention is shown attached to the discharge end 14 of a conduit 16. The regulator or accumulator 10 includes a turnip-shaped hollow body 18 having a larger diameter than the conduit 16. The body 18 provides an internal accumulation space or chamber 20. The gate 12 includes a series or array of downwardly and inwardly inclined, movable blades 22 mounted around the gate 12. The lower ends 24 of the blades 22 define a central opening 26 between them. Each of the blades 22 is biased inwardly toward a longitudinal or center line axis A of the body 18 and conduit 16 by a counterbalance mechanism 28 which urges the lower end 24 of the blade 22 inwardly to thereby reduce the area of the opening 26. Preferably, the blades 22 do not entirely close the central opening 26 so that at least a minimum opening area is maintained to allow the chamber 20 to self-empty. Preferably, the blades 22 are molded of a flexible-resilient material such as polyurethane which is highly abrasion resistant while delivering minimal damage to grain particles as they impinge upon the blades 22 and pass through the accumulator 10. Alternatively, the blades 22 may be made of metal or another rigid durable material.

The invention is described herein for use in controlling the flow of grain or other particulate material 30, and it is readily useful for other such materials. The particulate material 30 streams or flows through the conduit 16 and drops directly into the chamber of the accumulator or regulator 10. Preferably, the cross-sectional area of the opening 26 is smaller than the cross-sectional area of the conduit 16 so that a mass 32 of particulate material tends to accumulate at the gate 12 and above the opening 26 in the chamber 20. The accumulated particulate material mass 32 reduces the velocity of the particulate material 30 compared to the particulate material velocity entering the chamber 20.

The particulate material 30 in the chamber may be essentially unsegregated in that the finer and courser particles are randomly distributed. Alternatively, an impeller 34 may be mounted on a shaft 36 for rotation within the body 18 which during operation distributes the courser, heavier particulate material particles having more outward momentum toward the sidewalls of the body 18 as compared to the lighter, finer particles which are concentrated toward the center of the chamber 20 so that a rough separation is made and the stream density is increased. If sufficient fall is not available above the impeller 34 in the conduit 14, the shaft 36 is coupled to a right angle drive 38 and a transverse shaft 40 which is rotationally driven by a motor and gear box 42. An impeller 34 is disclosed in U.S. Pat. No. 4,203,535, which is hereby incorporated by reference in its entirety.

The counterbalance mechanism 28 is positioned to each of the blades 22 and applies a biasing force F to urge the blades 22 toward the longitudinal axis A and thereby tending to decrease the size of the opening 26. A flow surge of particulate material 30 in the conduit 16 causes the weight of the accumulation mass 32 to increase rapidly in the chamber 20. The greater downward force on the blades 22 as a result of the increasing accumulation mass 32 progressively forces the blades 22 open against the biasing force F of the counterbalance mechanism 28, which in turn increases the biasing force F on the blades 22 from the counterbalancing mechanism 28. As the blades 22 are urged away from the axis A to increase the size of the opening 26, the accumulation mass 32 discharges at a greater flow rate through the opening 26 but at a lower velocity than the incoming particulate material 30 from the conduit 16.

Figure 2:
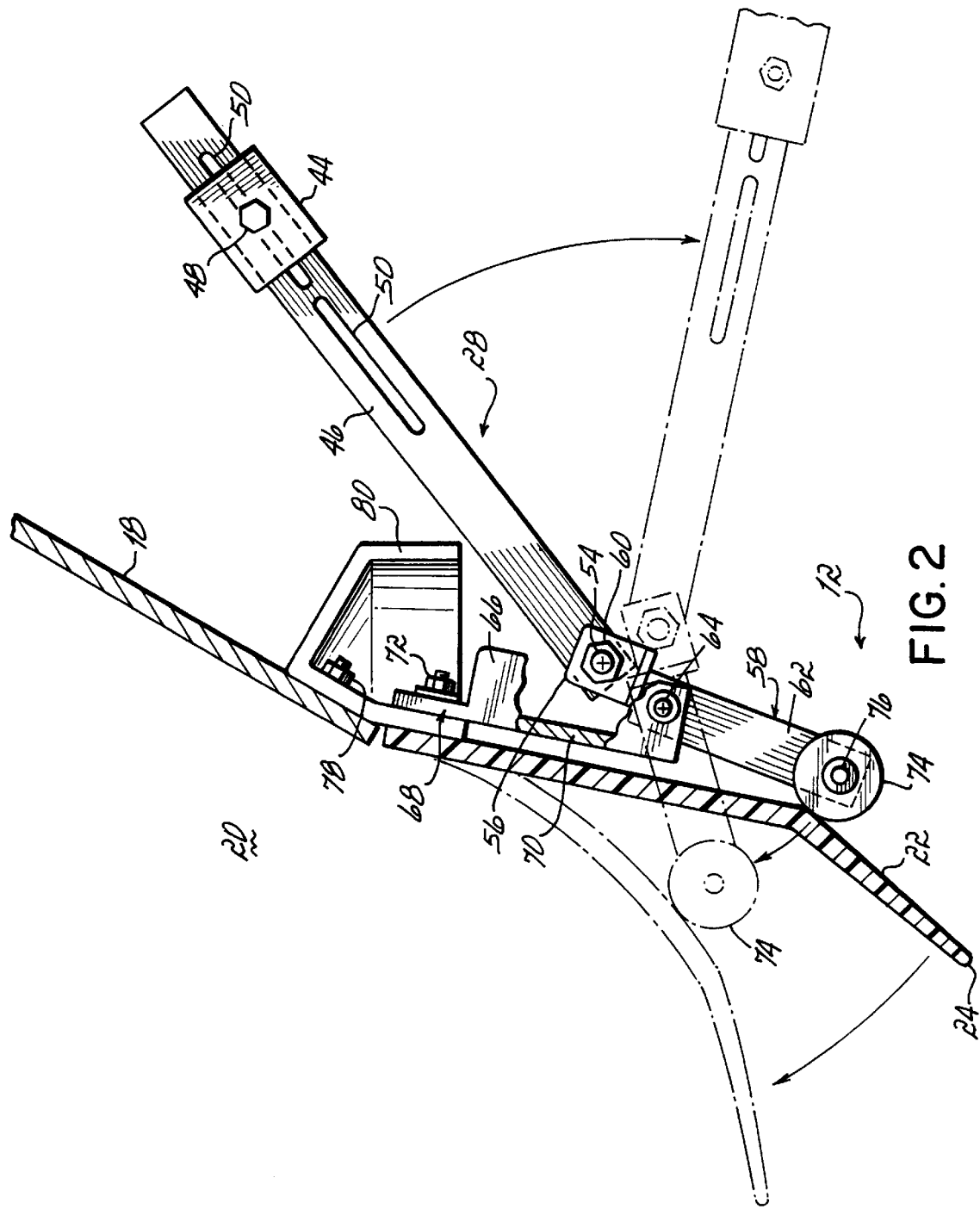
FIG. 2 is a cross-sectional view of one of the blades in an open configuration with the counterbalance mechanism attached thereto.
Figure 2A:
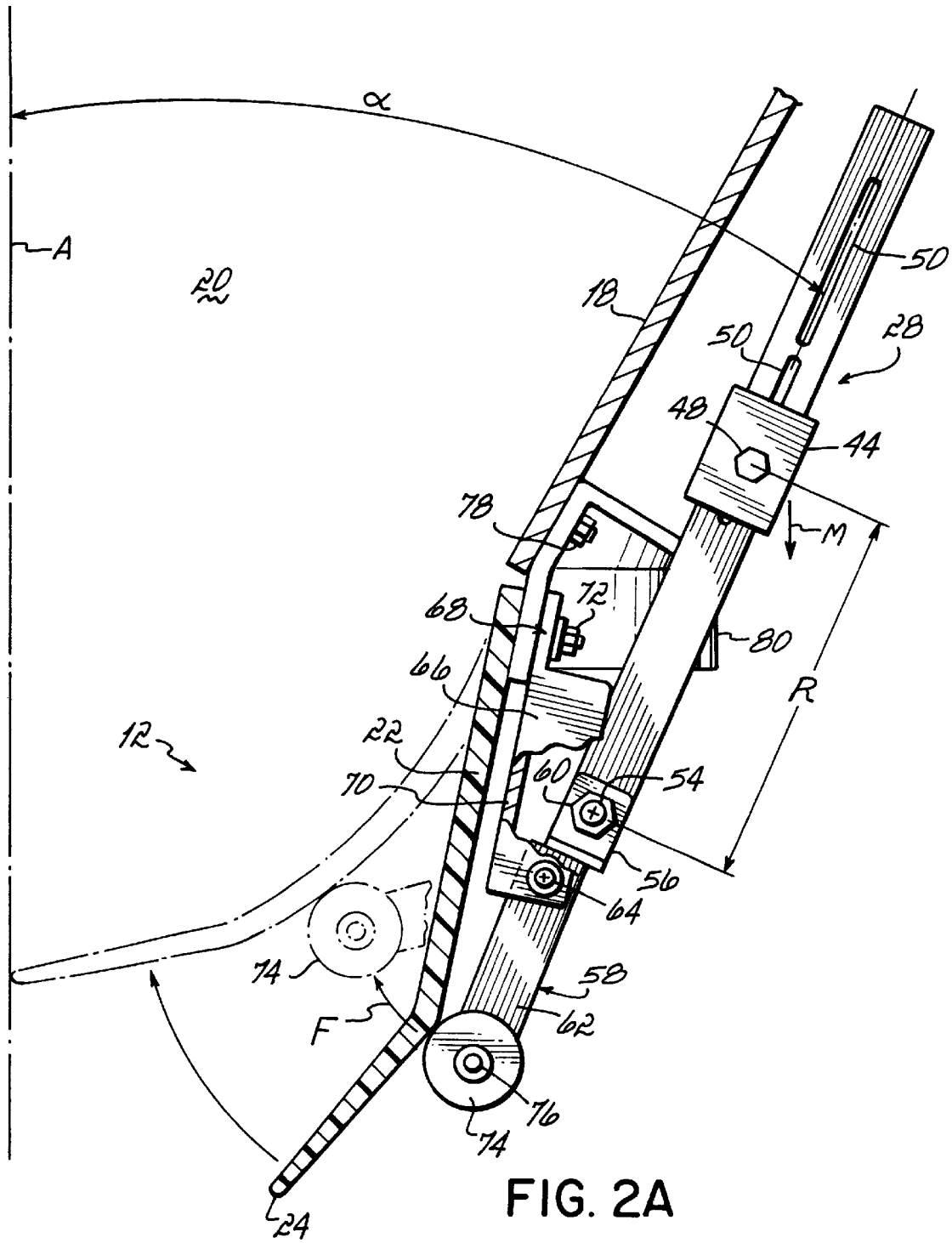
FIG. 2A is a view similar to FIG. 2 with the counterbalance mechanism adjusted to a different configuration providing a different biasing force from that of FIG. 2 to urge the blade toward a closed configuration.
Figure 3:
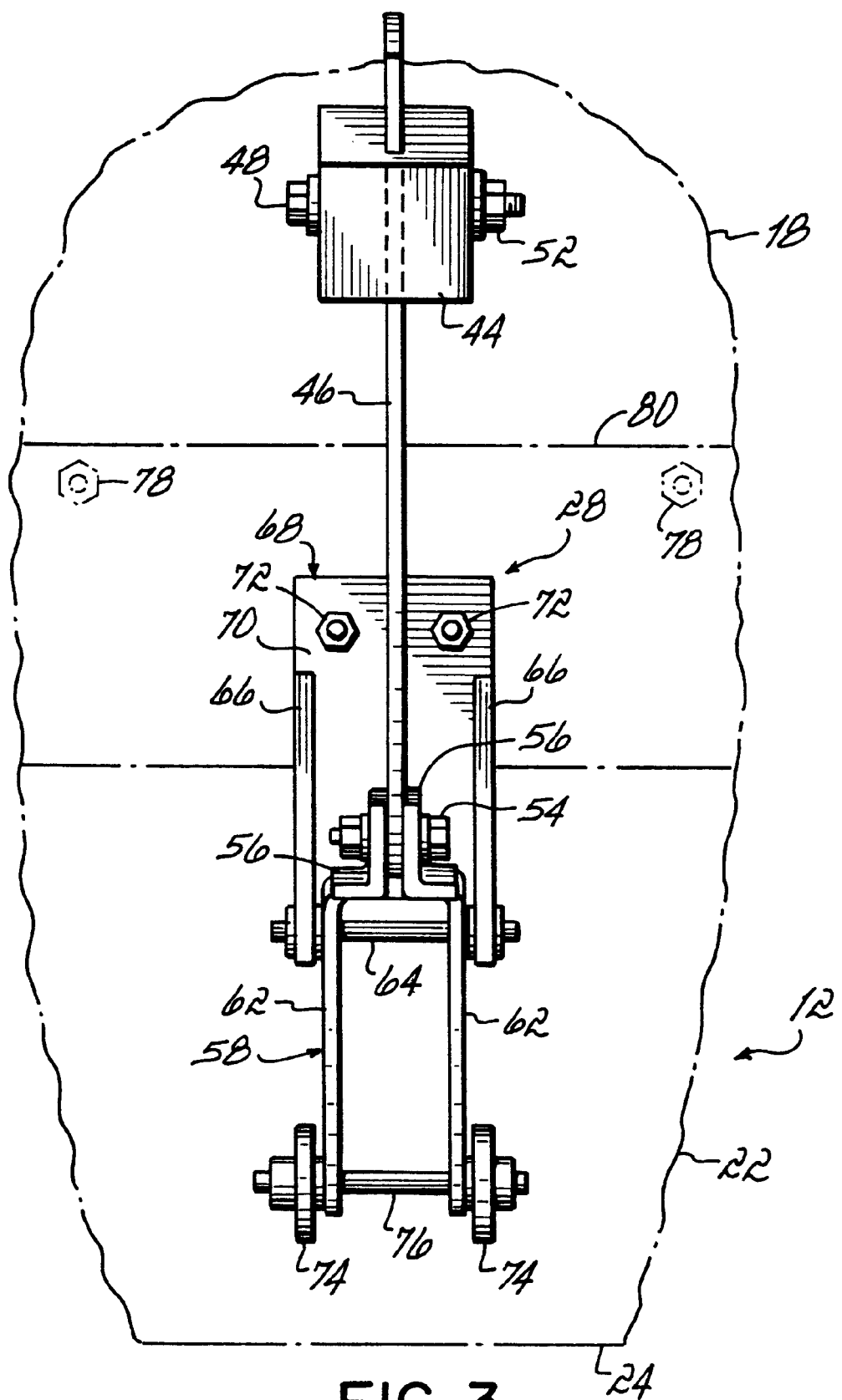
FIG. 3 is a plan view of the counterbalance mechanism according to a presently preferred embodiment of this invention.

A presently preferred embodiment of the counterbalancing mechanism 28 according to this invention is shown particularly in FIGS. 1 through 3. A separate counterbalance mechanism 28 is mounted to a valve ring 80 opposite each blade 22 and includes a counterweight 44 movably mounted on a lever arm 46. The counterweight 44 is mounted with a bolt 48 projecting through the counterweight 44 and one of two 50 slots provided in the lever arm 46. It will be appreciated that as a nut 52 on the bolt 48 is tightened, the counterweight 44 is secured in a first radial position R on the lever arm 46; whereas, as the nut 52 on the bolt 48 is loosened, the counterweight 44 may be repositioned along one of the slots 50. Moreover, the counterweight 44 may be repositioned from one slot 50 to the other slot 50 to increase the range of adjustment for the radial position R of the counterweight 44 on the lever arm 46, as shown by comparing FIGS. 2 and 2A. Additionally, a mass M of the counterweight 44 may be increased or decreased as is appropriate for further adjustments.

The lever arm 46 is pivotally mounted by a bolt 54 at a lower end thereof extending through upper bifurcated arms 56 of a yoke 58 of the counterbalance mechanism 28. A nut 60 on the bolt 54 is tightened to secure the lever arm 46 in a specific angular position identified by the angle α in FIG. 2A relative to the longitudinal axis A. The angular position a of the lever arm 46 may be adjusted by loosening the nut 60 on the bolt 54 and repositioning the lever arm 46 and, subsequently, tightening the nut 60 on the bolt 54 to secure the lever arm 46 in a different angular position α as shown by comparison of FIGS. 2 and 2A. The yoke 58 also includes a pair of downwardly extending legs 62. The yoke 58 is pivotally mounted around a pivot pin 64 extending between outwardly extending sidewalls 66 of a mounting bracket 68. The sidewalls 66 of the mounting bracket 68 are separated by a base plate 70 which is mounted by bolts 72 or other mechanical fasteners to an exterior surface of the blade 22. A pair of spaced rollers 74 are mounted on an axle 76 extending through holes proximate the lower end of the downwardly extending legs 62 of the yoke 58. The rollers 74 contact the outer surface of the blade 22 and thereby deliver the biasing force F to urge the blade 22 toward the center line axis A in a closed configuration as shown in phantom lines in FIG. 2.

Bolts 72 are used to attach the mounting brackets 68 and the blades 22 to the valve ring 80. Valve ring 80 is connected to the lower end of the body 18 with bolts 78. Sections or notches (not shown) may be formed in the annular valve ring 80 to provide for the appropriate angular position a of the lever arm 46 and movement of the lever arm 46 during operation of the counterbalance mechanism 28 and blade 22 without interfering with the valve ring. It should be readily understood by those of ordinary skill in the art that while the lever arm 46 is a presently preferred embodiment for mounting the counterweight 44, this invention is not limited to this particular configuration or method for mounting the counterweight 44 to cause a biasing force F or pressure on the blades 22.

Advantageously, as the particulate material 30 accumulates or builds up on the blades 22, the increasing weight of the accumulated mass 32 urges the blades 22 downwardly and outwardly thereby increasing the opening 26 and raising the lever arm 46 with the counterweight 44 attached thereto. With the counterbalance mechanism 28 in a presently preferred embodiment of this invention, there are three independent adjustment factors which can be implemented independently or collectively to precisely balance the counterweight mechanism 28 relative to the specific particulate material flow parameters. Specifically, the size or mass M of the counterweight 44, the radial position R of the counterweight 44 on the lever arm 46 and the angular position a of the lever arm 46 each may be adjusted individually or in combination to find the appropriate settings to always maintain an appropriate biasing force F of the blade 22 and pressure on the particulate material 30 while not delivering an excessive biasing force F with too much pressure on the blades 22 thereby causing a particulate material feed back-up or excessive accumulation mass 32 within the chamber 20. A viewing window 82 may be optionally added to the body 18 for visual inspection of the accumulated mass 32 within the chamber 20 to avoid interference with the operation of the impeller 34 and provide adequate information for adjusting the counterbalance mechanism 28 as appropriate.

The particulate material input variables of the quantity of particulate material, the variable diameter of the flow stream, the variable speed of the flow or height of drop of the material in addition to the kind of grain or particulate material and the associated weight thereof are factors which may be considered when adjusting the counterbalance mechanism 28. The counterbalance mechanism 28 provides for a variable biasing force F or a resistance upon a downward flow of the particulate material 30 so that the variable input forces available from respective parameters of the particulate material 30 are offset by the variable biasing or reaction forces delivered by the counterbalancing mechanism 28 to the blades 22. Importantly, this invention provides a highly sensitive counterbalancing mechanism 28 for acute and precise adjustment based on the proper particulate material flow parameters and operation of the accumulator or regulator 10 depending upon the particular type of grain or material 30.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

I claim:

1. A method of regulating the flow of a stream of particulate material which is falling in a downwardly inclined conduit, the method comprising:

interposing an array of downwardly and inwardly sloping blades having lower ends in the path of the flowing stream in the conduit, the blades slowing the movement of the material and deflecting the material toward a longitudinal axis of the conduit;

providing a central opening between the lower ends of the blades;

yieldably biasing the blades inwardly in a direction tending to reduce the size of the opening with a biasing force delivered by a counterbalance mechanism operably coupled to the blades, the blades restricting the fall of the material and slowing movement through the central opening so that a mass of the material accumulates above the opening;

continuously discharging particles from the accumulated mass through the opening while varying the size of the opening between the blades as the weight of the accumulated mass of material above said opening changes with flow rate variations of the material, the size of the opening increasing as the weight of the mass increases in response to an increase in the flow rate of the material; and adjusting the biasing force delivered by the counterbalance mechanism on the blades as a function of at least one of a mass, an angular position and a radial position of a counterweight of the counterbalance mechanism.

2. The method of claim 1 wherein the adjusting of he biasing force further comprises:

releasing the counterweight from a lever arm of the counterbalance mechanism;

repositioning the counterweight from a first position on the lever arm; and securing the counterweight at a different, second position on the lever arm.

3. The method of claim 1 wherein the adjusting of the biasing force further comprises:

releasing a lever arm pivotally coupled to a portion of the counterbalance mechanism;

pivoting the lever arm from a first angular position relative to a longitudinal centerline axis of the conduit; and securing the lever arm at a different, second angular position.

4. The method of claim 1 wherein the adjusting of the biasing force further comprises:

changing the mass of the counterweight of the counterbalance mechanism.

5. The method of claim 1 further comprising:

delivering the biasing force to each of the blades through a roller pivotally mounted relative to a portion of the counterbalance mechanism for rolling contact with an outer surface of the blade.

6. The method of claim 1 wherein the biasing force delivered to selected ones of the blades is adjusted without adjusting the biasing force delivered to a remainder of the blades.

7. The method of claim 1 further comprising:

viewing the accumulated mass through a window in the conduit.

8. The method of claim 1 wherein the biasing force is adjusted as a function of the mass, the angular position and the radial position of the counterweight.

9. A method of retrofitting a conduit through which particulate material flows, the conduit including a regulator for controlling the flow of the material therethrough, the regulator including a plurality of downwardly and inwardly sloping blades having lower ends in the path of the flowing material in the conduit, the blades slowing the movement of the material and deflecting the material toward a longitudinal axis of the conduit, the method comprising:

coupling a counterbalance mechanism to the blades to deliver a biasing force on the blades inwardly in a direction tending to reduce a size of an opening defined by lower ends of the blades through which the material flows, the blades restricting the fall of the material and slowing movement through the opening so that a mass of the material accumulates above the opening; and adjusting the biasing force delivered by the counterbalance mechanism on the blades as a function of at least one of a mass, an angular position and a radial position of a counterweight of the counterbalance mechanism.

10. The method of claim 9 further comprising:

mounting a roller pivotally coupled to a portion of the counterbalance mechanism for rolling contact with the outer surface of the blades to thereby deliver the biasing force to the blades.

11. An apparatus for regulating the flow of particulate material passing through a conduit comprising:

a body adapted to be mounted to a mouth of the conduit;

an array of blades each having a lower end and being coupled to the body, each of the blades projecting toward a centerline axis of the conduit, the lower ends of the blades defining an opening with an area that is smaller than a cross-sectional area of the conduit so that the material accumulates prior to passing through the opening; and a counterbalance mechanism coupled to the blades to produce a biasing force on the blades and bias the blades toward the centerline and reduce the area of the opening, the counterbalance mechanism permitting the blades to move outwardly away from the centerline in response to the weight of the accumulated material, the counterbalance mechanism including a counterweight and the biasing force delivered by the counterbalance mechanism on the blades being adjustable as a function of at least one of a mass, an angular position and a radial position of the counterweight of the counterbalance mechanism.

12. The apparatus of claim 11 wherein each of the blades has a distinct and separately adjustable counterbalance mechanism coupled thereto.

13. The apparatus of claim 11 further comprising:

a viewing window in the body through which to view the accumulated material.

14. The apparatus of claim 11 wherein each of the blades are pivotally coupled to a valve ring at a lower end of the body.

15. The apparatus of claim 11 wherein the counterbalance mechanism further comprises:

a lever arm pivotally mounted to a portion of the counterbalance mechanism for selectively adjusting the angular position of the counterweight.

16. The apparatus of claim 15 wherein a radial position of the counterweight on the lever arm is adjustable.

17. The apparatus of claim 11 wherein the counterbalance mechanism further comprises:

a roller pivotally coupled to a portion of the counterbalance mechanism and adapted to be placed into contact with an outer surface of the blades and deliver the biasing force to the blades.

18. The apparatus of claim 11 wherein the counterbalance mechanism further comprises:

a mounting bracket coupled to each of the blades;

a lever arm pivotally mounted to the mounting bracket for selectively adjusting the angular position of the counterweight mounted on the lever arm, wherein the radial position of the counterweight on the lever arm is adjustable; and a roller pivotally coupled to the mounting bracket and adapted to be placed into contact with an outer surface of the blades and deliver the biasing force to the blades.

19. The apparatus of claim 11 wherein the biasing force is adjustable as a function of the mass, the angular position and the radial position of the counterweight.

20. An apparatus for regulating the flow of particulate material passing through a conduit having a body mounted to a mouth of the conduit with an array of blades each having a lower end and being mounted to the body, each of the blades projecting toward a centerline axis of the conduit, the lower ends of the blades defining an opening with an area that is smaller than a cross-sectional area of the conduit so that the material accumulates prior to passing through the opening, the apparatus comprising:

a counterbalance mechanism adapted to be coupled to the blades to produce a biasing force on the blades and bias the blades toward the centerline and reduce the area of the opening, the counterbalance mechanism permitting the blades to move outwardly away from the centerline in response to the weight of the accumulated material, the counterbalance mechanism including a counterweight and the biasing force delivered by the counterbalance mechanism on the blades being adjustable as a function of at least one of a mass, an angular position and a radial position of the counterweight of the counterbalance mechanism.

* * * * *

UNITED STATES PATENT AND TRADEMARK OFFICE
CERTIFICATE OF CORRECTION

PATENT NO. : 6,085,987
DATED : July 11, 2000
INVENTOR(S) : Coy N. Haraway

It is certified that error appears in the above-identified patent and that said Letters Patent is hereby corrected as shown below:

Column 7 Line 6, "position a" should read --position $\alpha$--.

Column 7, Line 29, "position a" should read --position $\alpha$--.

Column 7, Line 52, "position a" should read --position $\alpha$--.

Column 8, line 54, "of he biasing" should read --of the biasing--.

Signed and Sealed this

Fifteenth Day of May, 2001

Attest:

NICHOLAS P. GODICI

Attesting Officer        Acting Director of the United States Patent and Trademark Office